# (12) United States Patent
Hoefer et al.

(10) Patent No.: US 8,524,808 B2
(45) Date of Patent: Sep. 3, 2013

(54) RADIATION CURABLE COMPOSITIONS

(75) Inventors: Rainer Hoefer, Duesseldorf (DE); Laurence Druene, Perthes en Gatinais (FR); Jean-Marc Ballin, Noisy le Grand (FR); Morgan Garinet, Vaux le Penil (FR)

(73) Assignee: IGM Group B.V., Waalwijk (NL)

( * ) Notice: Subject to any disclaimer, the term of this patent is extended or adjusted under 35 U.S.C. 154(b) by 1623 days.

(21) Appl. No.: 11/791,411

(22) PCT Filed: Nov. 12, 2005

(86) PCT No.: PCT/EP2005/012147
§ 371 (c)(1),
(2), (4) Date: Oct. 25, 2007

(87) PCT Pub. No.: WO2006/056331
PCT Pub. Date: Jun. 1, 2006

(65) Prior Publication Data
US 2008/0095946 A1    Apr. 24, 2008

(30) Foreign Application Priority Data

Nov. 22, 2004   (FR) ...................... 04 52704

(51) Int. Cl.
*C08L 63/00*    (2006.01)
(52) U.S. Cl.
USPC ........... 523/414; 523/403; 427/121; 427/123; 427/126.1; 427/457; 427/487; 525/523; 525/524; 525/525; 525/526; 525/529

(58) Field of Classification Search
USPC .............. 523/414, 415, 403; 427/407.1, 121, 427/123, 126, 487, 457; 525/523–526, 529–531
See application file for complete search history.

(56) References Cited

U.S. PATENT DOCUMENTS

| 4,446,258 | A | 5/1984 | Chu et al. |
| 4,636,541 | A | 1/1987 | Stevens et al. |
| 5,548,005 | A * | 8/1996 | Kurth et al. ................... 523/414 |
| 5,792,827 | A | 8/1998 | Hintze-Brüning et al. |
| 6,410,617 | B1 | 6/2002 | Sulzbach et al. |
| 7,087,684 | B2 | 8/2006 | Sulzbach et al. |
| 7,094,816 | B2 | 8/2006 | Hoefer et al. |

FOREIGN PATENT DOCUMENTS

| EP | 0 562 860 A1 | 9/1993 |
| WO | WO 95/18165 A1 | 7/1995 |
| WO | WO 96/20970 A1 | 7/1996 |
| WO | WO 97/15615 A1 | 5/1997 |
| WO | WO 00/02944 A1 | 1/2000 |
| WO | WO 00/02945 A1 | 1/2000 |
| WO | WO 02/085997 A1 | 10/2002 |

OTHER PUBLICATIONS

Höfer et al., "Additifs pour la synthése et la formulation des peintures á l'eau", Double Liaison, No. 531, (Jan. 2003), pp. 29-37.
Höfer et al., "Sustainable development by new additives and resin systems", European Coatings Journal, (Sep. 2003), pp. 34, 36 & 53-55.

* cited by examiner

*Primary Examiner* — Mark Kopec
*Assistant Examiner* — Haidung Nguyen
(74) *Attorney, Agent, or Firm* — Fox Rothschild LLP

(57) ABSTRACT

The invention is a radiation curable coating composition containing epoxyacrylate formed by ring opening reaction between (meth)acrylic acid and a self-dispersing epoxy resin in an aqueous system.

13 Claims, No Drawings

RADIATION CURABLE COMPOSITIONS

CROSS-REFERENCE TO RELATED APPLICATIONS

This application is filed under 35 U.S.C. §371 claiming priority from Application PCT/EP2005/012147 filed on Nov. 12, 2005, which claims priority of French Application No. 0452704 filed Nov. 22, 2004, the entire contents of which are incorporated herein by reference.

FIELD OF THE INVENTION

This invention relates to radiation-curable water-based coating compositions with a content of epoxyacrylates.

BACKGROUND OF THE INVENTION

WO 02/85997 describes water-based coating compositions with a content of curable components consisting of (A) 0.5 to 90% by weight epoxy resins solid at 20° C. which are self-dispersing in water, (B) 0.5 to 90% by weight (meth)acrylic acid esters of a polyol, (C) 5.0 to 99.0% by weight water and (D) 0 or 0.1 to 3% by weight organic solvents with the following provisos: (i) the methacrylic acid esters (B) contain at least 2 reactive (meth)acryl groups per molecule, (ii) the sum of the percentages by weight of components (A) to (D) is 100% by weight and (iii) the Brookfield viscosity of the composition (as measured at 23° C.) is less than 15,000 mPas.

WO 00/02945 and WO 00/02944 describe curable epoxy resins self-dispersing in water and a process for their production. The epoxy resins are special compounds based on α,β-unsaturated carboxylic acid esters. The documents in question also describe aqueous dispersions containing these special epoxy resins and the use of these special epoxy resins for coating solid substrates, more particularly for formulating water-based road marking paints.

BRIEF DESCRIPTION OF THE INVENTION

The problem addressed by the present invention was to provide radiation-curable water-based coating compositions. These compositions would have at most a small content of organic solvents, but would preferably be free from such solvents. In addition, the compositions would be distinguished by good handling and application behavior (=incorporation in applicationally useful systems). The water-based compositions would be suitable for coating and printing various substrates, more particularly wood, plastics and metal.

The present invention relates to radiation-curable water-based coating compositions with a content of epoxyacrylates (E), these compositions being obtainable by
(A) reacting epoxy resins self-dispersing in aqueous systems at 20° C. with
(B) acrylic and/or methacrylic acid,
and subsequently dispersing the epoxyacrylates (E) obtained in an aqueous system,
with the proviso that the reaction between components (A) and (B) is conducted in such a way that the epoxide groups present in component (A) are predominantly ring-opened by the carboxyl functions present in component (B). By "predominantly" is meant that more than 50% of the epoxy groups are ring-opened.

The present invention differs from the above-cited WO 02/85997 in which self-dispersing epoxy resins are used together with (meth)acrylic acid esters of polyols as coating compositions. Accordingly, no epoxyacrylates are present in the aqueous dispersions according to WO 02/85997, instead epoxy resins and polyol (meth)acrylic acid esters are present alongside one another in the dispersions. Crosslinking only occurs through the addition of a hardener. The (aminic) hardener reacts on the one hand with the C=C double bonds of the photomer in a Michael addition (relatively fast reaction) and, on the other hand, with the epoxy groups of the epoxy resin (relatively slow reaction). Overall, a complex crosslinking reaction takes place which—it must be emphasized—is a chemical crosslinking reaction involving an (aminic) hardener and not a radiation-induced curing process. The described correlations are clearly apparent from the description of WO 02/85997 and particularly from the Examples. In Example 1, Waterpoxy® 1422 (self-dispersing epoxy resin) is mixed with Photomer 4017 (hexanediol diacrylate). Example 2 then shows how Waterpoxy® 751 (an aminic hardener) is added to the aqueous dispersion of Example 1 for curing.

DETAILED DESCRIPTION OF THE INVENTION

Component (A)

Component (A) is an epoxy resin which is self-dispersing in aqueous systems at 20° C. By "self-dispersing" is meant that the corresponding compounds lead to dispersions or emulsions spontaneously, i.e. without the assistance or co-operation of special emulsifiers, dispersants or the like, when they are brought into contact with aqueous systems. The term "aqueous systems" on the one hand encompasses water as such and, on the other hand, water containing up to 10% by weight of water-soluble low molecular weight alcoholic co-solvents, for example ethoxypropanol.

In the interests of clarity, it is pointed out that the direct reaction products of bisphenol A and/or bisphenol F with epichlorohydrin do not fall under the definition of component (A) because these compounds are not self-dispersing in water.

In a preferred embodiment of the present invention, compounds (A) which are self-dispersing in aqueous systems because they contain polyalkylene oxide units (PAO units) are used in the production of the epoxyacrylates (E). Compounds suitable as PAO units are not only polyalkylene oxides as such, for example polyethylene glycols, but also reaction products of hydroxyfunctional compounds with alkylene oxides and compounds which are obtainable by converting the terminal hydroxyl groups of reaction products of hydroxyfunctional compounds with alkylene oxides into amino groups. So far as the reaction of hydroxyfunctional compounds with alkylene oxides is concerned, ethoxylation and propoxylation are of particular importance. The following procedure is normally adopted: in a first step, the desired hydroxyfunctional compound is contacted with ethylene oxide and/or propylene oxide and the resulting mixture is reacted at temperatures of 20 to 200° C. in the presence of an alkaline catalyst. Addition products of ethylene oxide (EO) and/or propylene oxide (PO) are obtained in this way. The addition products are preferably EO adducts or PO adducts or EO/PO adducts with the particular hydroxyfunctional compound. In the case of the EO/PO adducts, the addition of EO and PO may take place statistically or blockwise.

In one embodiment, the compounds used in accordance with the invention as PAO units for component (A) correspond to the general formula $R^1$—O—$R^2$—$CH_2CH(R^3)$—$NH_2$ where
$R^1$ is a monofunctional organic group containing 1 to 12 carbon atoms which may be aliphatic, cycloaliphatic or aromatic $R^2$ is a polyoxyalkylene group made up of 5 to 200 polyoxyalkylene units, more particularly EO and/or PO units $R^3$ is hydrogen or an aliphatic radical containing up to 4 carbon atoms.

Particularly suitable representatives of the compounds used in accordance with the invention as PAO units for component (A) are the "Jeffamines" known to the expert which are commercially available substances. "Jeffamine® 2070" is mentioned as an example. The average molecular weights (number average: Mn) of the compounds used in accordance with the invention as PAO units for component (A) are preferably in the range from 400 to 2,000.

Examples of suitable compounds (A) are the compounds formed by reaction of an epoxy resin with mono-, di- or polyalkylene amines in accordance with the disclosure of WO-A-95118165 or by reaction of an epoxy resin with polyfunctional phenols and amine epoxide adducts in accordance with the disclosure of WO-A-96/20970. Further examples of suitable compounds A) are the self-dispersing epoxy resins according to the disclosures of WO-A-00/02944 and WO-A-00/02945.

Production of the Epoxy Acrylates

As already mentioned, the epoxyacrylates (E) according to the invention are produced by reaction of epoxy resins (A) self-dispersing in aqueous systems at 20° C. with acrylic and/or methacrylic acid (B), the reaction between components (A) and (B) being conducted in such a way that the epoxide groups present in component (A) are predominantly ring-opened by the carboxyl functions present in component (B). The epoxide groups are preferably completely ring-opened. Basically, the acylation process is not subject to any particular limitations and may be carried out by any of the methods known to the relevant expert. If desired, a catalyst may be used. It may also be desirable to carry out the acylation under conditions which guarantee that polymerization of component (B) is suppressed. Any of the methods known to the relevant expert may also be used in this regard.

Production of the Aqueous Dispersions

The epoxyacrylates (E) according to the invention are dispersed in an aqueous system. This may be done by any of the methods known to the relevant expert. More particularly, part of the required quantity water may first be added to the epoxyacrylates at elevated temperature and the system intensively mixed and then cooled, resulting in the formation of an emulsion or dispersion to which the remaining water is then added at moderate temperatures.

Use

The present invention also relates to the use of the aqueous dispersions of epoxyacrylates (E) obtainable as described above as radiation-curable compositions for coating systems, such as paints, coating compositions and the like. The aqueous dispersions of the epoxyacrylates (E) may be used, optionally along with suitable additives, for coating a variety of substrates, for example glass, metal, wood, paper, ceramics and plastics. Advice on the formulation of water-containing epoxyacrylates can be found, for example, in R. Höfer, H.-G. Schulte, C. Galopin, G. Félix, *Additifs pour la synthése et la formulation des peintures à l'eau, Double Liaison*, 531, 29 (1/2003) or in R. Höfer, T. Roloff, H.-G. Schulte, *Sustainable development by new additives and resin systems*, ECJ 34 (09/2003).

The aqueous dispersions of the epoxyacrylates (E) are particularly suitable for coating wood both as a primer and as a topcoat. Excellent adhesion to wood was generally observed. In addition, as a topcoat, they are also distinguished by very high gloss and good resistance to chemicals (for example to acetic acid, citric acid and ethanol) and by high scratch and abrasion resistance.

EXAMPLES

Example 1

577.94 g ChemRes® E20 (unmodified bisphenol A resin liquid at 20° C.; a product of Cognis Deutschland GmbH & Co. KG) and 0.88 g of a reaction product of propoxylated pentaerythritol with epichlorohydrin were introduced under nitrogen into a reactor and mixed. 141.56 g Jeffamine® M-2070 (polyether amine commercially available from Huntsman), 158.99 g bisphenol A and 0.63 g triphenylphosphine were then added and the mixture was heated to a temperature of 140° C. An exothermic reaction began and the temperature was kept at 165 to 170° C. for 30 minutes. After cooling to 130° C., 120.0 g ethoxypropanol were added and the whole was thoroughly mixed. The mixture obtained was used in Example 2.

Example 2

88.72 g of the mixture obtained in accordance with Example 1 were introduced together with 0.25 g 4-methoxyphenol into a glass flask equipped with a gas inlet pipe, stirrer and reflux condenser. After heating to 90° C. while air was passed through (3.5 kg/hour), the mixture was kept under reflux at that temperature. A mixture of 10.53 g acrylic acid and 0.5 g triphenyl phosphine was then added over a period of 30 minutes during which the mixture was kept at 90° C. The mixture was then left to react for 16 hours. The passage of air (see above) was maintained throughout. The product obtained was then cooled to 80° C., followed by the addition of water with vigorous stirring. The mixture underwent a reduction in viscosity. After cooling to 45° C., the mixture was kept at that temperature for 30 minutes, resulting in the formation of an emulsion. Finally, another 70 g water were slowly added. An aqueous epoxyacrylate dispersion was obtained.

We claim:

1. A radiation-curable, water-based, coating composition comprising: epoxyacrylates obtained by:
   reacting, in an aqueous system at 20° C.,
   (A) a self-dispersing epoxy resin containing polyalkylene oxide units with (B) an acrylic and/or methacrylic acid to form an epoxyacrylate; and
   dispersing the epoxyacrylate in an aqueous system, with the proviso that the reaction between components (A) and (B) is conducted in such a way that the epoxide groups present in component (A) are ring-opened predominantly by the carboxyl functional groups present in component (B).

2. The coating composition according to claim 1, wherein the polyalkylene oxide units correspond to the following general formula:

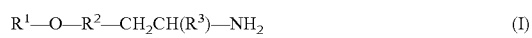

$$R^1\text{—}O\text{—}R^2\text{—}CH_2CH(R^3)\text{—}NH_2 \qquad (I)$$

wherein $R^1$ is a monofunctional, aliphatic, cycloaliphatic, or aromatic organic group containing 1 to 12 carbon atoms, $R^2$ is a polyoxyalkylene group comprising 5 to 200 polyoxyalkylene residues, and $R^3$ is hydrogen or an aliphatic group containing up to 4 carbon atoms.

3. The coating composition according to claim 2, wherein the polyalkylene oxide units comprise the residue of at least one member selected from the group consisting of ethylene oxide and propylene oxide, wherein the number average molecular weight of the polyalkylene oxide residue is from 400 to 2,000.

4. A method for coating a substrate which comprises applying the composition according to claim 1 to a substrate selected from the group consisting of glass, metal, wood, paper, ceramics and plastics.

5. The method according to claim 4, wherein the composition is applied as a primer for coating wood.

6. The method according to claim 4, wherein the composition is applied as a topcoat.

7. The composition according to claim 2, wherein the polyoxyalkylene group comprises ethylene oxide and propylene oxide residues.

8. A primer comprising the composition of claim 1.

9. A primer for wood comprising the composition of claim 1.

10. A topcoat comprising the composition of claim 1.

11. A topcoat for wood comprising the composition of claim 1.

12. A wood product comprising as a topcoat the composition of claim 1.

13. A wood product comprising as a primer the composition of claim 1.

* * * * *